(12) United States Patent
Sun et al.

(10) Patent No.: US 11,934,223 B2
(45) Date of Patent: Mar. 19, 2024

(54) FOLDABLE ELECTRONIC DEVICE

(71) Applicant: Acer Incorporated, New Taipei (TW)

(72) Inventors: Hui-Ping Sun, New Taipei (TW);
Chun-Hung Wen, New Taipei (TW);
Yen-Chou Chueh, New Taipei (TW);
Chun-Hsien Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 17/827,807

(22) Filed: May 30, 2022

(65) Prior Publication Data

US 2023/0099982 A1    Mar. 30, 2023

(30) Foreign Application Priority Data

Sep. 24, 2021   (TW) .................................. 110135687

(51) Int. Cl.
*G06F 1/16* (2006.01)

(52) U.S. Cl.
CPC .......... *G06F 1/1616* (2013.01); *G06F 1/1637* (2013.01); *G06F 1/1679* (2013.01); *G06F 1/1681* (2013.01)

(58) Field of Classification Search
CPC .... G06F 1/1616; G06F 1/1632; G06F 1/1637; G06F 1/1679; G06F 1/1681; G06F 1/162
See application file for complete search history.

(56) References Cited

U.S. PATENT DOCUMENTS

| | | | | |
|---|---|---|---|---|
| 5,276,945 | A * | 1/1994 | Matsumura | A47K 13/12 16/337 |
| 8,074,322 | B2 * | 12/2011 | Wang | G06F 1/1616 16/342 |
| 9,625,953 | B2 * | 4/2017 | Bitz | H04M 1/0216 |
| 9,625,954 | B2 * | 4/2017 | Campbell | E05D 7/12 |
| 9,910,465 | B2 * | 3/2018 | Tazbaz | G06F 1/1681 |
| 10,162,389 | B2 * | 12/2018 | Tazbaz | H04M 1/022 |
| 10,175,729 | B2 * | 1/2019 | Kuramochi | G06F 1/1616 |
| 10,401,916 | B1 * | 9/2019 | Sanchez | E05D 11/1014 |
| 10,437,293 | B2 * | 10/2019 | Bitz | G06F 1/1681 |
| 10,761,573 | B2 * | 9/2020 | Hsu | G06F 1/1681 |
| 11,036,261 | B2 * | 6/2021 | Huang | G06F 1/1616 |
| 11,301,006 | B2 * | 4/2022 | Hsu | G06F 1/1652 |

(Continued)

FOREIGN PATENT DOCUMENTS

| | | |
|---|---|---|
| CN | 102955513 | 3/2013 |
| CN | 104632868 | 6/2017 |

*Primary Examiner* — Rockshana D Chowdhury
(74) *Attorney, Agent, or Firm* — JCIPRNET (57) ABSTRACT

A foldable electronic device, including a first body having a first shaft member, at least one second body having a second shaft member, and a latching member, is provided. The first shaft member and the second shaft member are coaxially pivoted together. The first shaft member has a recess. The second shaft member has a locking hole. The latching member is movably disposed in the recess and the locking hole, so that when the latching member leaves the locking hole, the first body and the second body are relatively pivoted through the first shaft member and the second shaft member, or when the latching member moves into the locking hole, the latching member interferes with the first shaft member and the second shaft member to block the first body and the second body from relatively pivoting.

8 Claims, 8 Drawing Sheets

(56) References Cited

U.S. PATENT DOCUMENTS

| | | | | |
|---|---|---|---|---|
| 2010/0031471 A1* | 2/2010 | Tang | ................... | G06F 1/1616 |
| | | | | 16/250 |
| 2012/0282983 A1* | 11/2012 | Koike | .................. | H04M 1/021 |
| | | | | 455/575.3 |
| 2013/0044415 A1* | 2/2013 | Peng | ................... | G06F 1/1616 |
| | | | | 361/679.01 |
| 2014/0362507 A1* | 12/2014 | Kinoshita | ............... | G06F 1/166 |
| | | | | 16/374 |
| 2015/0300066 A1* | 10/2015 | Chen | .................. | E05D 11/1007 |
| | | | | 16/350 |

\* cited by examiner

FOLDABLE ELECTRONIC DEVICE

CROSS-REFERENCE TO RELATED APPLICATION

This application claims the priority benefit of Taiwan application serial no. 110135687, filed on Sep. 24, 2021. The entirety of the above-mentioned patent application is hereby incorporated by reference herein and made a part of this specification.

BACKGROUND

Technical Field

The disclosure relates to a foldable electronic device.

Description of Related Art

Existing laptops with movable or rotatable screens mostly dispose strong magnets on the screens, supports, or relevant parts of hosts, so that when the screen rotates to a specific position along an axis, the angle of the screen is fixed (or positioned) by the magnetic attraction caused by the magnet.

The above technical means not only requires relevant bodies to free up spaces for the strong magnets, but also requires the user to spend great effort in order to release the fixed (or positioned) state due to the strong attraction of the magnets, that is, the user needs to hold the host or the support with one hand, so that the other hand can rotate the screen, which causes considerable inconvenience and trouble.

SUMMARY

The disclosure provides a foldable electronic device, which provides relative rotation of a body in a timely manner through a latching mechanism in a rotating shaft.

A foldable electronic device of the disclosure includes a first body, at least one second body, and a latching member. The first body has a first shaft member. The first shaft member has a recess. The second body has a second shaft member. The first shaft member and the second shaft member are coaxially pivoted together. The second shaft member has a locking hole. The latching member is movably disposed in the recess and the locking hole, so that when the latching member leaves the locking hole, the first body and the second body are relatively pivoted through the first shaft member and the second shaft member, or when the latching member moves into the locking hole, the latching member interferes with the first shaft member and the second shaft member to block the first body and the second body from relatively pivoting.

Based on the above, in the foldable electronic device, the first shaft member and the second shaft member are coaxially pivoted to each other, so that the first body having the first shaft member and the second body having the second shaft member can be relatively pivoted. At the same time, the movable latching member is further disposed in the shaft members to match the recess of the first shaft member and the locking hole of the second shaft member, so that the first shaft member and the second shaft member are latched or unlatched through the movement of the latching member between the recess and the locking hole, thereby enabling the first body and the second body to possess or release the ability of relatively pivoting according to the position of the latching member at specific time and state.

DETAILED DESCRIPTION OF DISCLOSED EMBODIMENTS

Figure 1:
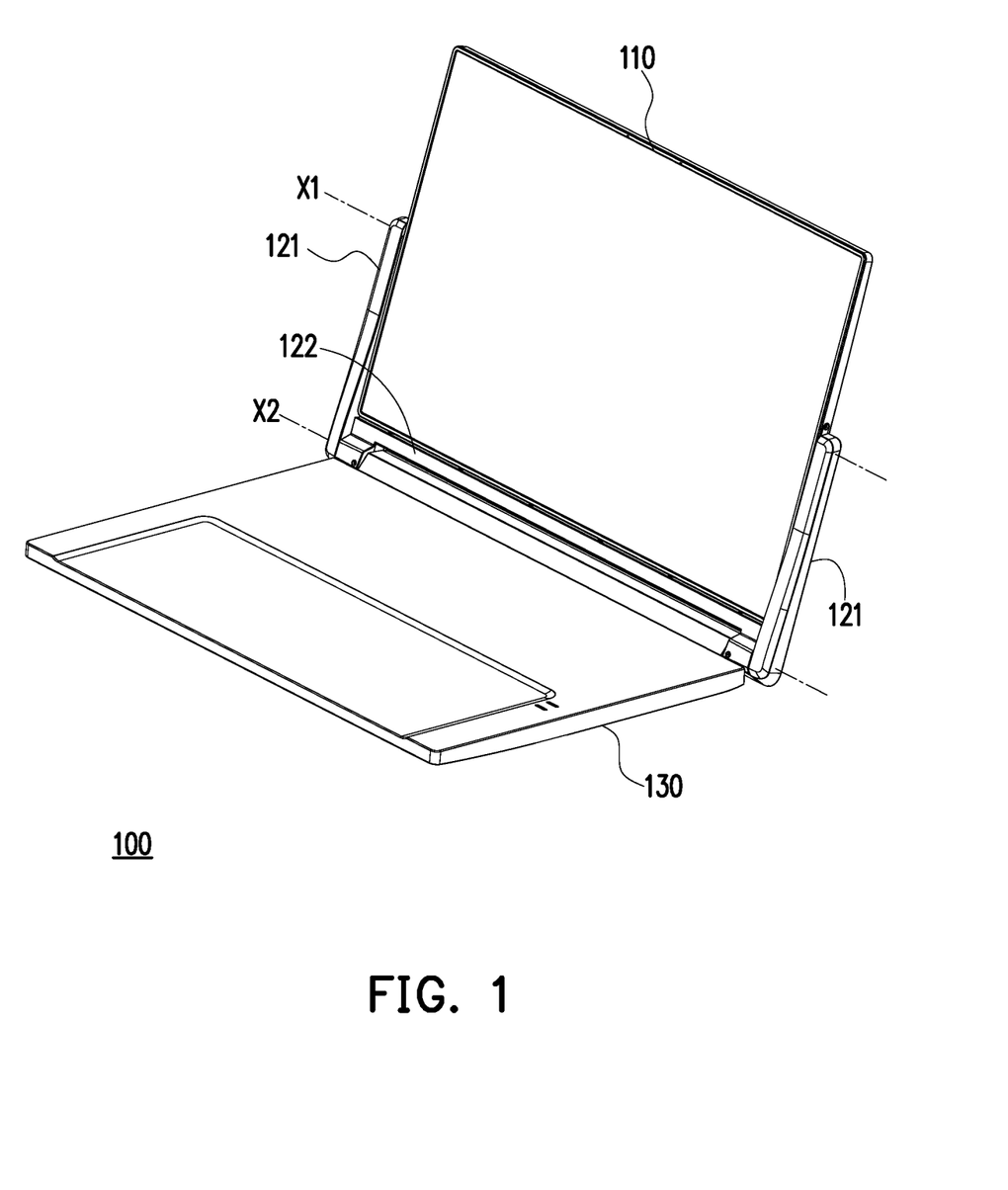
FIG. 1 is a schematic view of a foldable electronic device according to an embodiment of the disclosure.
Figure 2:
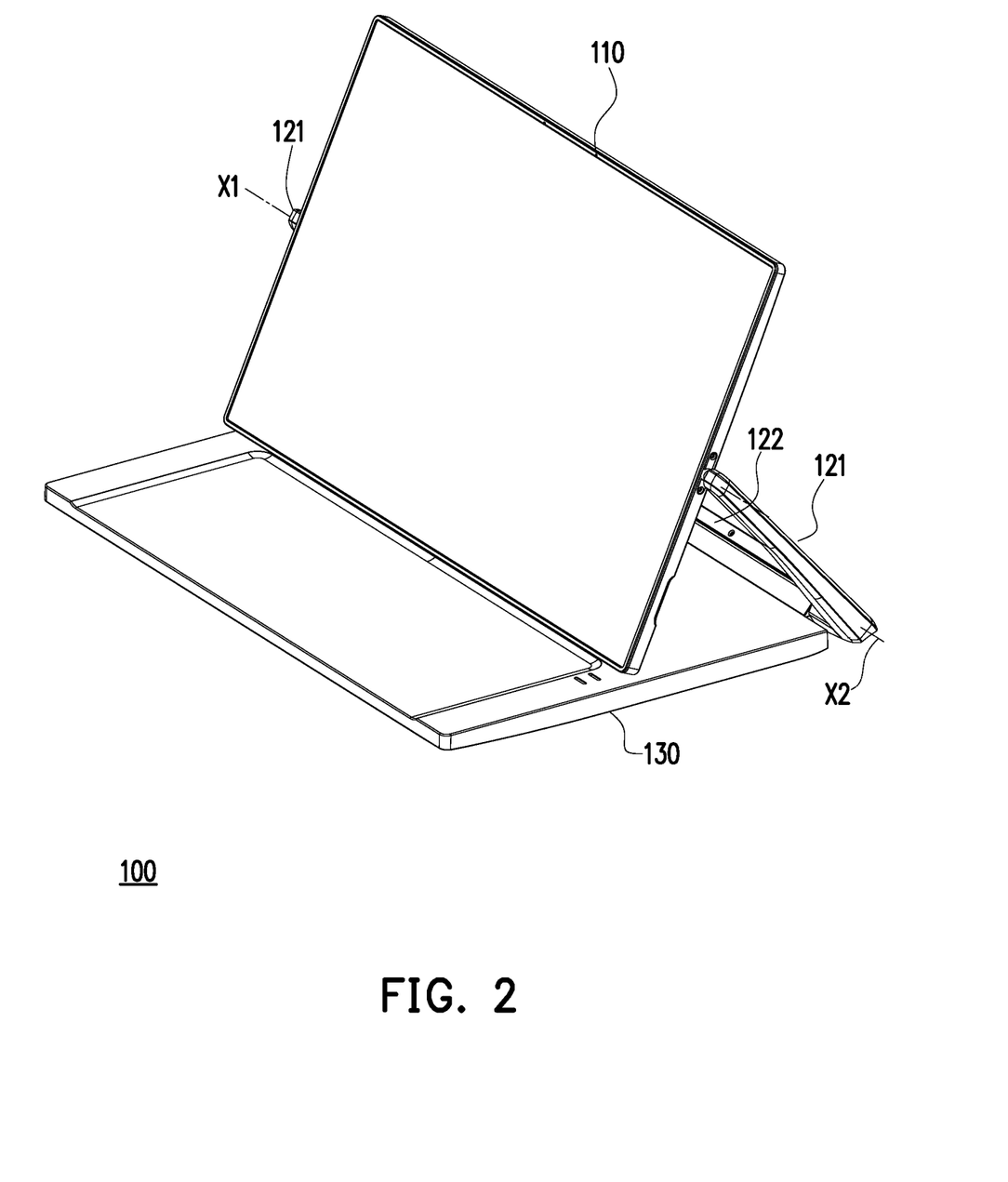
FIG. 2 is a schematic view of the foldable electronic device of FIG. 1 in another state.
Figure 3:
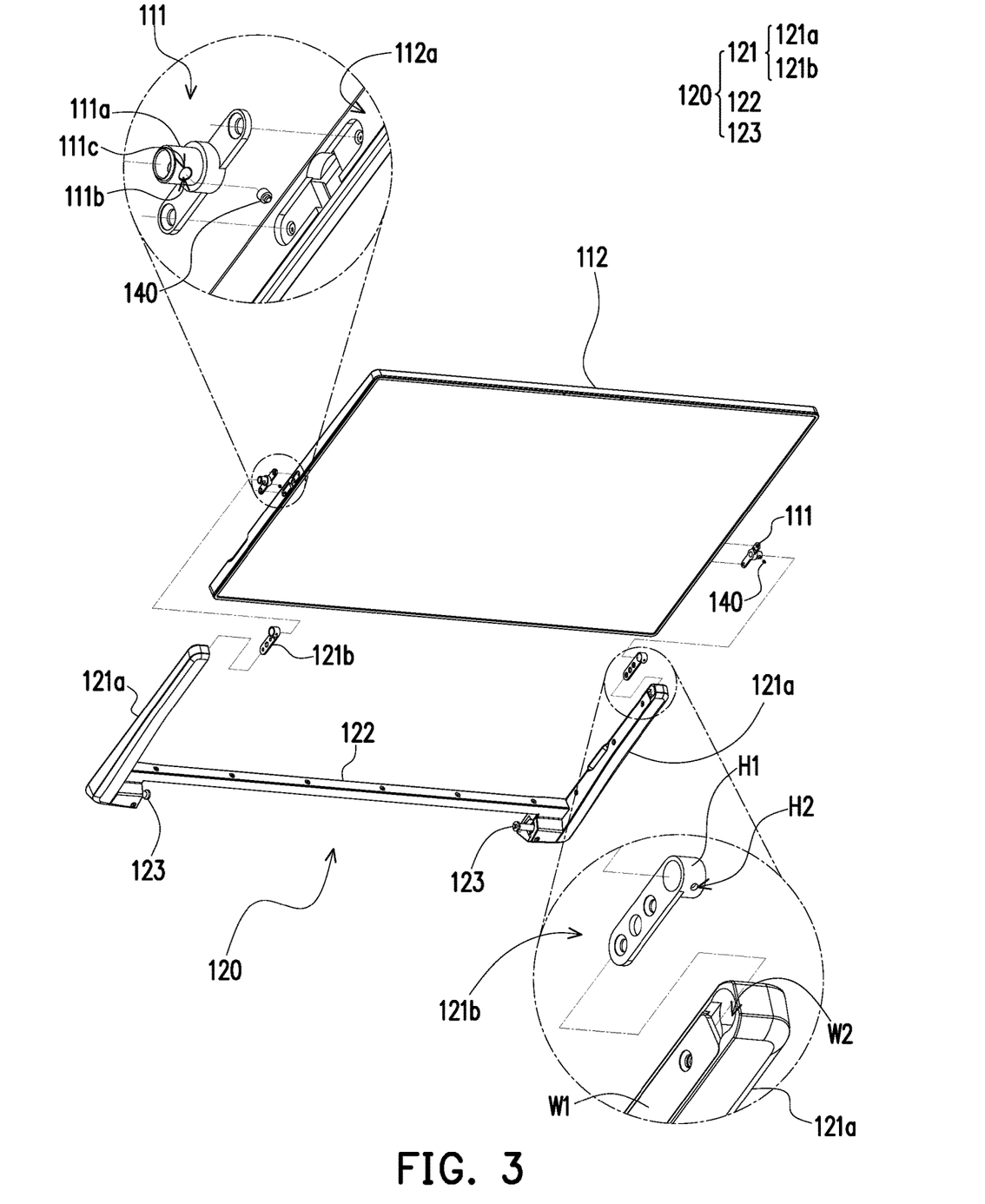
FIG. 3 is an exploded view of some components of the foldable electronic device.

FIG. 1 is a schematic view of a foldable electronic device according to an embodiment of the disclosure. FIG. 2 is a schematic view of the foldable electronic device of FIG. 1 in another state. FIG. 3 is an exploded view of some components of the foldable electronic device. Please refer to FIG. 1 to FIG. 3 at the same time. In the embodiment, a foldable electronic device 100 includes a first body 110, at least one second body 121, and a latching member 140. The first body 110 has a first shaft member 111. The first shaft member 111 has a recess 111*b*. The second body 121 has a second shaft member 121*b*. The first shaft member 111 and the second shaft member 121*b* are coaxially pivoted together. The second shaft member 121*b* has a locking hole H2. The latching member 140 is movably disposed in the recess 111*b* and the locking hole H2, so that when the latching member 140 leaves the locking hole H2, the first body 110 and the second body 121 are relatively pivoted through the first shaft member 111 and the second shaft member 121*b*, or when the latching member 140 moves into the locking hole H2, the latching member 140 interferes with the first shaft member 111 and the second shaft member 121*b* to block the first body 110 and the second body 121 from relatively pivoting.

Furthermore, the foldable electronic device 100 also includes a third body 130 and a hinge 123. The third body 130 is, for example, a system host of a notebook computer. The second body 121 is, for example, a pair of support arms of the support 120, which are connected to each other through a beam 122 to form the support 120. One end of each support arm is pivoted to the third body 130 through the hinge 123, and the other end of each support arm is provided with the first shaft member 111 to be pivoted to the first body 110 in conjunction with the second shaft member 121*b*. The first body 110 is, for example, a screen. The screen is pivoted to the support 120 with an axis X1 as a rotation axis thereof. The support 120 is pivoted to the system host through the hinge 123 with an axis X2 as a rotation axis thereof. Therefore, after the first body 110 and the second body 121 are rotated and expanded relative to the third body 130 through the hinge 123 (as shown in FIG. 1), the first body 110 and the second body 121 are relatively pivoted through the first shaft member 111 and the second shaft member 121b (as shown in FIG. 2).

Please refer to FIG. 3 again. In the embodiment, the first body 110 includes a display body 112 and the first shaft member 111. The first shaft member 111 is assembled to a side surface 112a of the display body 112. Relevant assembly components (such as screws or rivets) are omitted here. The first shaft member 111 has a hollow shaft portion 111a and the recess 111b formed in the hollow shaft portion 111a. An opening 111c of the recess 111b is exposed on an outer surface of the hollow shaft portion 111a. The second body 121 includes an arm body 121a and the second shaft member 121b. The arm body 121a also has a side wall W1 and an accommodating recess W2. The second shaft member 121b is assembled to an inner surface of the side wall W1. The second shaft member 121b has a shaft sleeve portion H1 and the locking hole H2 located on the shaft sleeve portion H1. The shaft sleeve portion H1 is located in the accommodating recess W2 and is correspondingly sleeved onto an outer surface of the hollow shaft portion 111a, so that the two are both pivoted with the axis X1. In practice, the shaft sleeve portion H1 and the hollow shaft portion 111a are pivoted through riveting while there is friction between the two, so that the display body 112 can rotate relative to the arm body 121a and stop at any angle. Furthermore, the latching member 140 is movably disposed in the recess 111b of the first shaft member 111 and is submerged in the recess 111b or partially protrudes from the recess 111b along with the movement state of the first shaft member 111, which will be further described later.

Figure 4A:
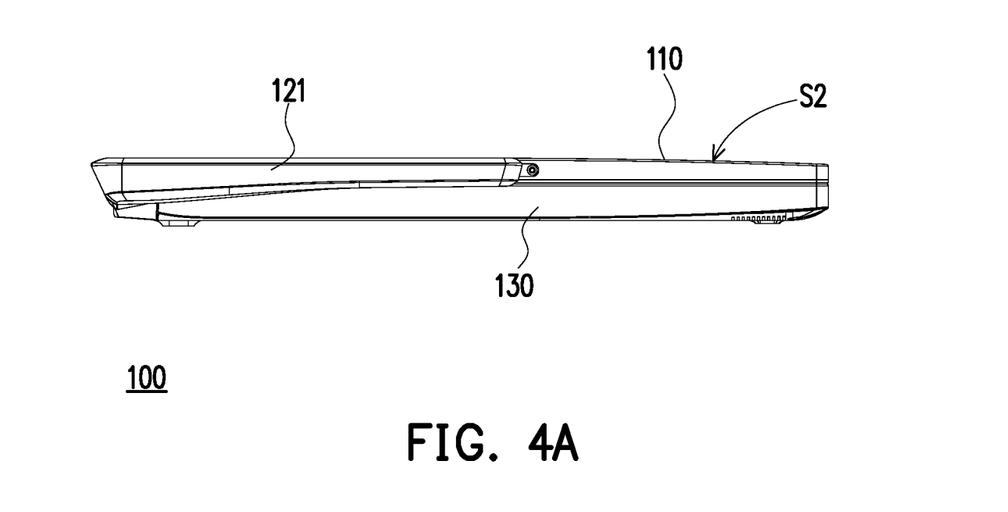
FIG. 4A is a side view of the foldable electronic device in another state.
Figure 4B:
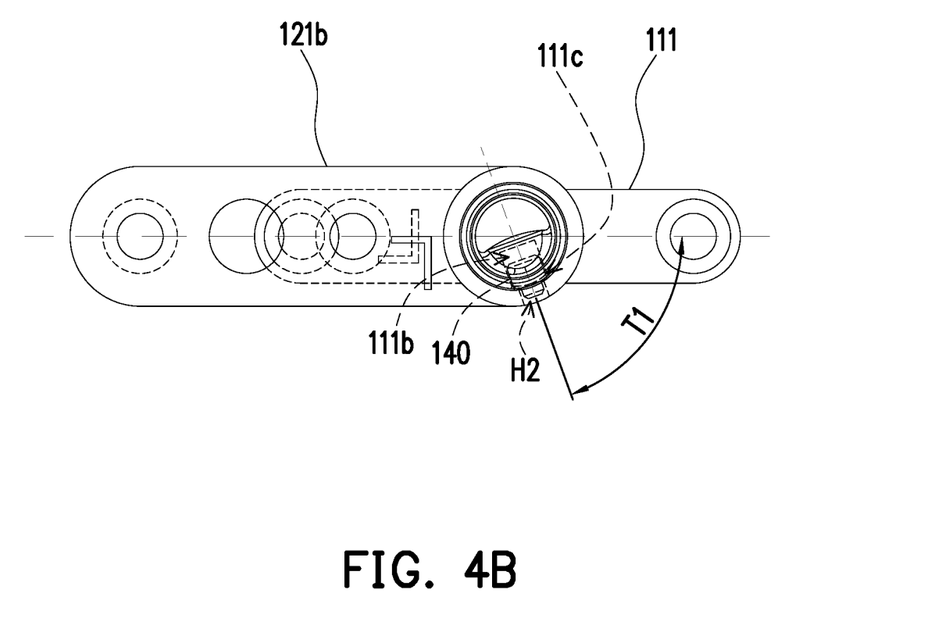
FIG. 4B is an enlarged view of some components of FIG. 4A.
Figure 4C:
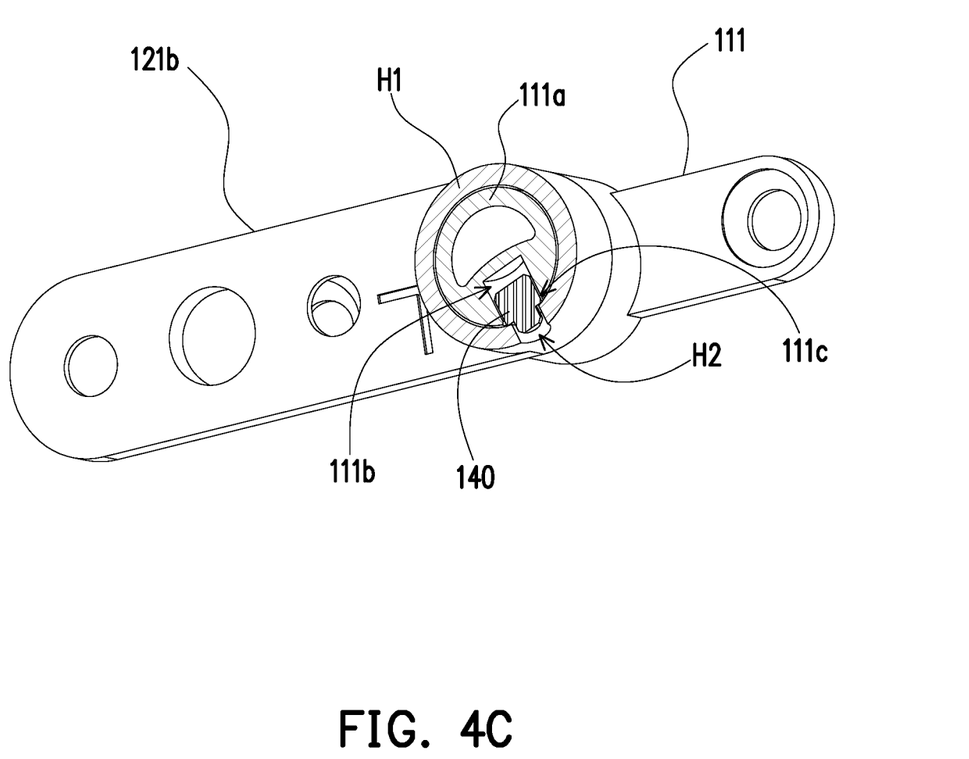
FIG. 4C is an enlarged cross-sectional view of some components of FIG. 4A.

FIG. 4A is a side view of the foldable electronic device in another state. FIG. 4B is an enlarged view of some components of FIG. 4A. FIG. 4C is an enlarged cross-sectional view of some components of FIG. 4A. Please refer to FIG. 4A to FIG. 4C at the same time. In the embodiment, the foldable electronic device 100 is in a closed state, that is, the first body 110 and the second body 121 can be regarded as being on the same plane. As shown by the dashed lines in FIG. 4B, the latching member 140 is, for example, a double-layer coaxial protruding column, and a column portion thereof with a greater outer diameter is less than or equal to an inner diameter of the recess 111b, so that the latching member 140 can smoothly move in the recess 111b. An inner diameter of the locking hole H2 is greater than a column portion of the latching member 140 with a smaller outer diameter and is less than a column portion of the latching member 140 with a greater outer diameter. The locking hole H2 will move through the opening 111c of the recess 111b along with the rotation of the second shaft member 121b, so that the state shown in FIG. 4C can be generated. The column portion of the latching member 140 with the smaller outer diameter can move into the locking hole H2. The column portion of the latching member 140 with the greater outer diameter abuts against the shaft sleeve portion H1 to be substantially engaged to the opening 111c of the recess 111b. At this time, a portion of the latching member 140 moves into the locking hole H2 while interfering with the first shaft member 111 and the second shaft member 121b. Also, at this time, the opening 111c of the recess 111b and the locking hole H2 face the same direction and form an angle T1 relative to the plane. Here, the latching member 140 is, for example, made of stainless steel or a material with a specific weight of greater than 7 g/cm$^3$. At the same time, the friction between the surface of the latching member 140 and the recess 111b and the locking hole H2 should be reduced as much as possible to ensure that the latching member 140 can smoothly achieve the above movement by virtue of gravity.

Figure 5A:
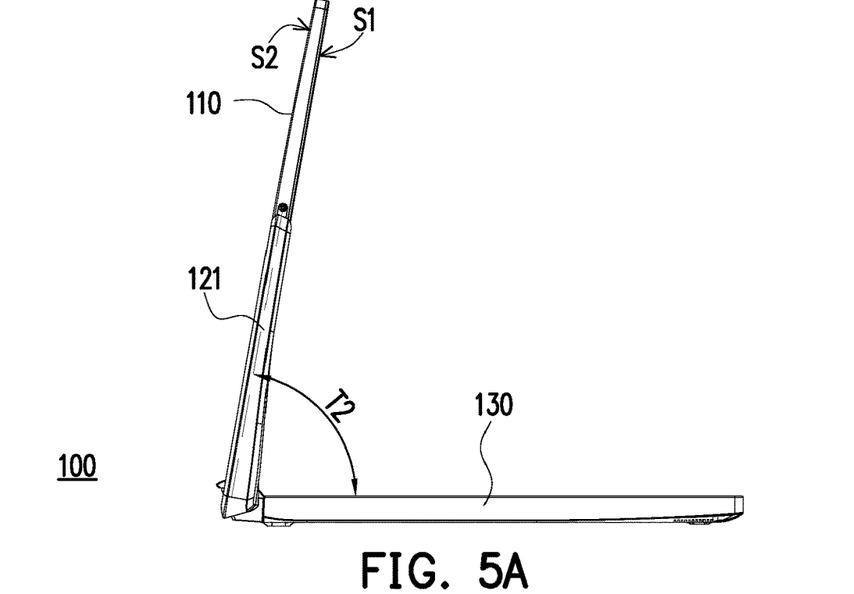
FIG. 5A is a side view of the foldable electronic device in another state.
Figure 5B:
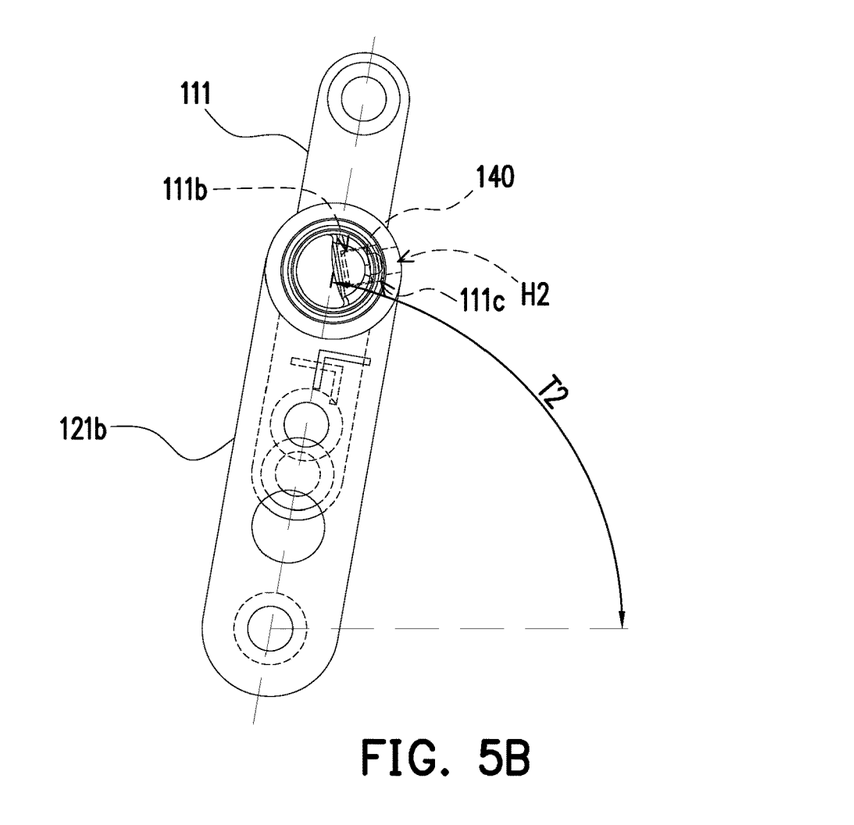
FIG. 5B is an enlarged view of some components of FIG. 5A.

FIG. 5A is a side view of the foldable electronic device in another state. FIG. 5B is an enlarged view of some components of FIG. 5A. Please refer to FIG. 5A and FIG. 5B at the same time. Next, in the latching state where the latching member 140 interferes with the first shaft member 111 and the second shaft member 121b at the same time, the first body 110 and the second body 121 are rotated and expanded to an angle T2 relative to the third body 130, which is equivalent to rotating from the state shown in FIG. 4A to the state shown in FIG. 5A, so that the latching member 140 moves out of the locking hole H2 by gravity. At this point, the latching state of the first body 110 and the second body 121 is released to be relatively pivoted with the axis X1 (as shown in FIG. 1 and FIG. 2). For example, the first body 110 may be pivoted to the state shown in FIG. 2.

Figure 6A:
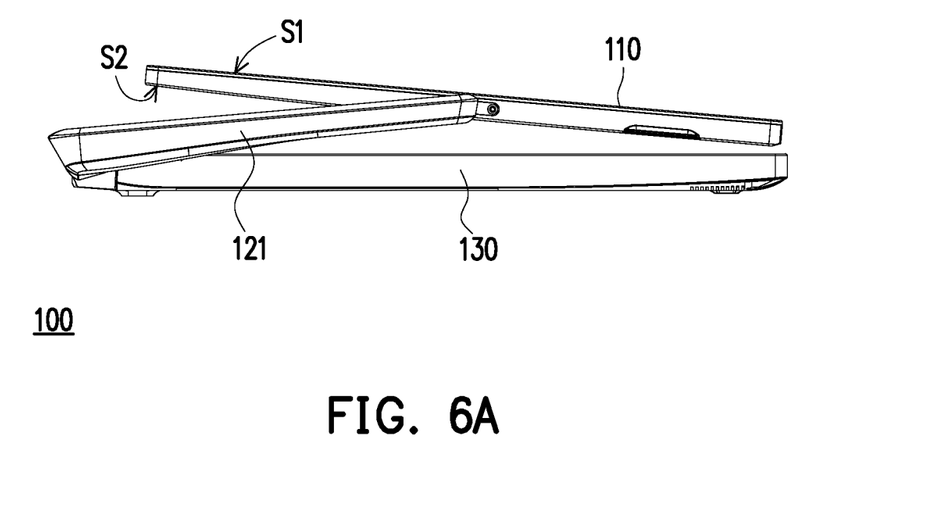
FIG. 6A is a side view of the foldable electronic device in another state.
Figure 6B:
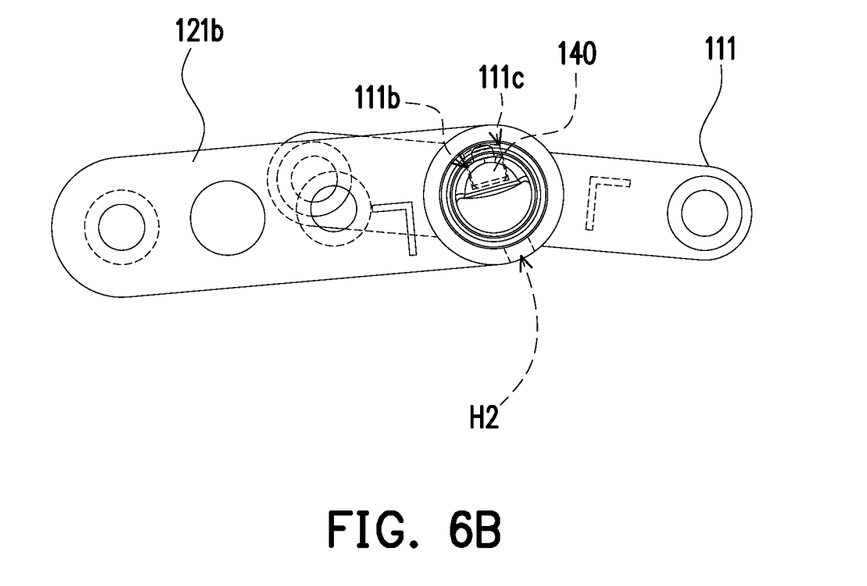
FIG. 6B is an enlarged view of some components of FIG. 6A.

FIG. 6A is a side view of the foldable electronic device in another state. FIG. 6B is an enlarged view of some components of FIG. 6A. Please refer to FIG. 6A and FIG. 6B at the same time and compare with FIG. 2. Furthermore, the user can continue to pivot the first body 110 relative to the second body 121 to the state of FIG. 6A, that is, let a surface S1 (a display surface) of the first body 110 back face the third body 130, and a surface S2 (a back surface) of the first body 110 face the third body 130 to form a plate-like state. It should be noted that during the relative pivoting process of the first shaft member 111 and the second shaft member 121b, the recess 111b and the locking hole H2 are uniquely corresponding to each other, which is equivalent to that the locking hole H2 is the only configuration on the second shaft member 121b. Therefore, only a specific position (angle) can enable the latching member 140 to move into the locking hole H2 to cause interference.

Figure 7A:
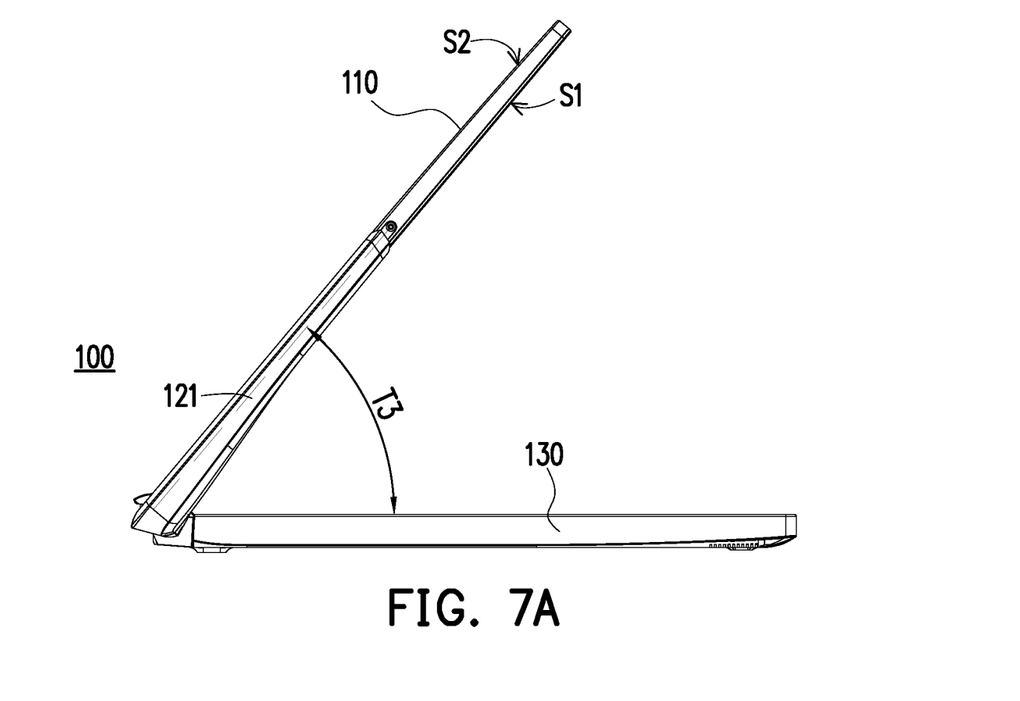
FIG. 7A is a side view of the foldable electronic device in another state.
Figure 7B:
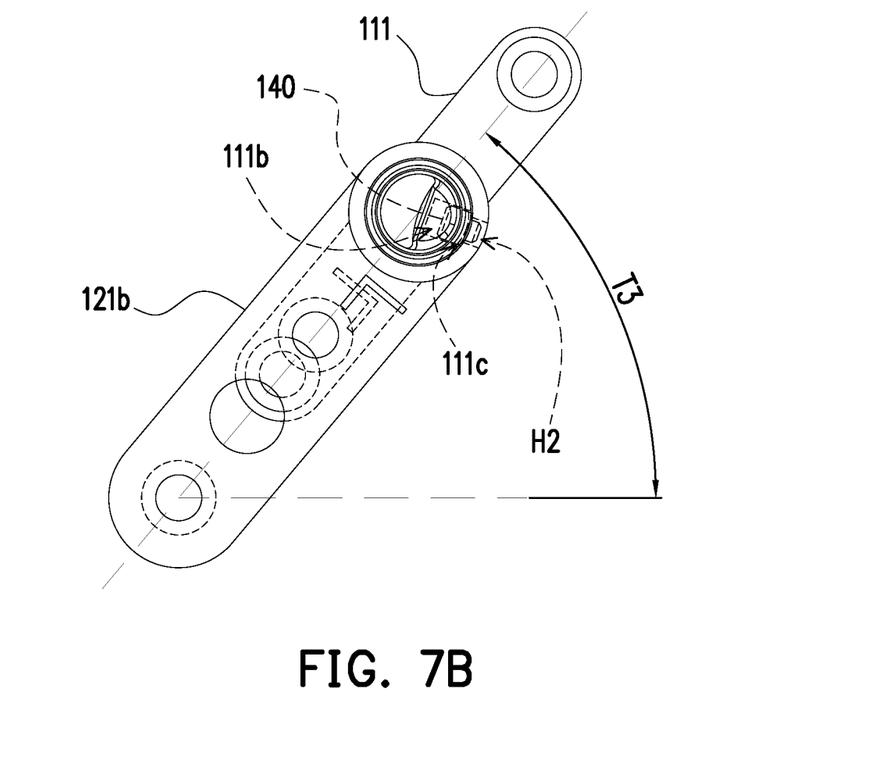
FIG. 7B is an enlarged view of some components of FIG. 7A.

FIG. 7A is a side view of the foldable electronic device in another state. FIG. 7B is an enlarged view of some components of FIG. 7A. Please refer to FIG. 7A and FIG. 7B at the same time and compare with FIG. 5A. When the first body 110 and the second body 121 are on the same plane and are pivoted to an angle T3, that is, the specific position (angle), relative to the third body 130 at the same time, the latching member 140 can move into the locking hole H2 again by gravity to convert to the latching state.

In summary, in the foldable electronic device of the above embodiments of the disclosure, the first shaft member and the second shaft member are coaxially pivoted to each other, so that the first body having the first shaft member and the second body having the second shaft member can be relatively pivoted. At the same time, the movable latching member is further disposed in the shaft members to match the recess of the first shaft member and the locking hole of the second shaft member, so that when the first shaft member and the second shaft member are relatively rotated to the specific position (angle), the latching member moves between the recess and the locking hole, causing the first shaft member and the second shaft member to be latched or unlatched, thereby enabling the first body and the second body to possess or release the ability of relatively pivoting according to the position of the latching member at the specific time and state, so as to avoid the inconvenience and trouble caused to the user by the additional configuration of the positioning structure on the body.

What is claimed is:

1. A foldable electronic device, comprising:
a first body, having a first shaft member, wherein the first shaft member has a recess;
at least one second body, having a second shaft member, wherein the first shaft member and the second shaft member are coaxially pivoted together, and the second shaft member has a locking hole; and
a latching member, movably disposed in the recess and the locking hole, so that when the latching member leaves the locking hole, the first body and the second body are relatively pivoted through the first shaft member and the second shaft member, or when the latching member moves into the locking hole, the latching member interferes with the first shaft member and the second shaft member to block the first body and the second body from relatively pivoting,
wherein the latching member moves into or out of the locking hole by gravity during a whole folding process of the first body and the second body, wherein when the first body and the second body are located on a same plane, a portion of the latching member moves into the locking hole to interfere with the first shaft member and the second shaft member.

2. The foldable electronic device according to claim 1, wherein the locking hole moves through an opening of the recess along with rotation of the second shaft member.

3. The foldable electronic device according to claim 1, wherein during a relative pivoting process of the first shaft member and the second shaft member, the recess and the locking hole are uniquely corresponding to each other.

4. The foldable electronic device according to claim 1, wherein the first shaft member has a hollow shaft portion and the recess formed in the hollow shaft portion, an opening of the recess is exposed on an outer surface of the hollow shaft portion, and the latching member is movably disposed in the recess and is submerged in the recess or partially protrudes from the recess along with a movement state of the first shaft member.

5. The foldable electronic device according to claim 4, wherein the second shaft member has a shaft sleeve portion and the locking hole located on the shaft sleeve portion, and the shaft sleeve portion is sleeved onto an outer surface of the hollow shaft portion.

6. The foldable electronic device according to claim 1, further comprising a third body and a hinge, wherein the hinge is connected between the second body and the third body.

7. The foldable electronic device according to claim 6, comprising two of the second bodies respectively being a pair of support arms of a support, wherein the support is connected to the third body through the hinge, and one end of each of the support arms is provided with the second shaft member to be pivoted to the first body.

8. The foldable electronic device according to claim 1, wherein a direction where an opening of the recess is facing is consistent with the locking hole and forms an acute angle relative to the plane.

* * * * *